United States Patent [19]

Bowers

[11] Patent Number: 4,864,302

[45] Date of Patent: Sep. 5, 1989

[54] DATA ENTRY SYSTEMS FOR CONVERTING AN ANALOG INSTRUMENT TO MACHINE-READABILITY

[76] Inventor: Davis L. Bowers, 9385 La Suvida Dr., San Diego, Calif. 92402

[21] Appl. No.: 80,218

[22] Filed: Jul. 30, 1987

Related U.S. Application Data

[63] Continuation of Ser. No. 695,341, Jan. 30, 1985, abandoned, which is a continuation-in-part of Ser. No. 579,722, Feb. 13, 1984.

[51] Int. Cl.$^4$ .......................... H03N 1/22; G01D 5/34
[52] U.S. Cl. ............................... 341/13; 250/231 SE; 235/462; 341/2
[58] Field of Search ...................... 340/347 P, 347 M; 250/231 SE; 235/462, 463; 33/137 R; 73/293, 385; 341/2, 13, 137

[56] References Cited

U.S. PATENT DOCUMENTS

| | | | |
|---|---|---|---|
| 3,237,012 | 2/1966 | Treffeisen | 250/231 SE |
| 3,869,598 | 3/1975 | Englund et al. | 341/2 |
| 4,143,267 | 3/1979 | Johnson et al. | 33/137 R |
| 4,196,845 | 4/1980 | Chesters | 235/482 |
| 4,537,150 | 8/1985 | Bowers | 119/14.17 |
| 4,654,524 | 3/1987 | Kita | 341/13 |

FOREIGN PATENT DOCUMENTS

| | | |
|---|---|---|
| 0095883 | 12/1983 | European Pat. Off. |
| 2816301 | 10/1978 | Fed. Rep. of Germany |
| 2526184 | 11/1983 | France |
| 2018069 | 10/1979 | United Kingdom |
| 2092339 | 8/1982 | United Kingdom |

OTHER PUBLICATIONS

Hausmann et al., Physics, D. Van Nostrand Company, Inc., 1935, pp. 282-287.
Patent Abstracts of Japan, vol. 6, No. 162 (p-137) 25 Aug. 1982 (Sharp K.K.).

Primary Examiner—William M. Shoop, Jr.
Assistant Examiner—Helen Kim
Attorney, Agent, or Firm—Woodcock Washburn Kurtz Mackiewicz & Norris

[57] ABSTRACT

Bar codes are shown for measurement of volumes of liquids, e.g., the amount of milk collected in a dairy milking operation, and correlation therewith to identification of the source of the liquid, such as a cow. In the preferred embodiment, infrared or laser scanners are used to scan bar codes to provide an input to a computer for correlating the container or the source of liquid with the volume of liquid, whereby complex volume measuring devices and operator measurements can be substantially eliminated. Similar techniques can be used to provide computer input data representing a wide variety of analog inputs; e.g., by providing a bar code scale for juxtaposition to a thermometer, the segments of the code along the scale being selected in accordance with the mercury level at a given temperature, simple analog-to-digital temperature data conversion and input is obtained. Methods and apparatus for providing machine-readability for a number of differing types of analog instrumentation are described.

15 Claims, 6 Drawing Sheets

DIGITS 2,4,0,1

DATA ENTRY SYSTEMS FOR CONVERTING AN ANALOG INSTRUMENT TO MACHINE-READABILITY

CROSS-REFERENCE TO RELATED APPLICATIONS

This is a continuation of application Ser. No. 695,341, filed Jan. 30, 1985, now abandoned, which is a continuation-in-part of copending Ser. No. 579,722, filed Feb. 13, 1984.

FIELD OF THE INVENTION

This invention relates to improved methods and apparatus for data entry into computer systems. More particularly, the invention relates to use of bar coded identifications of items, such as vessels, and of quantities or qualities, such as the amount of liquid in a vessel or its temperature, for ready and accurate entry into a computer system for processing. In a preferred embodiment, discussed in detail, bar codes are utilized for data entry as applied to the dairy industry.

BACKGROUND AND OBJECTS OF THE INVENTION

The recent and well publicized reduction in cost of computer equipment and software has led to the application of these devices to an ever-increasing range of use. One prime example of computerization in recent years has been the application of computer technology to agriculture. For example, systems are now commercially available in which a computer is informed when a given cow has approached a feeding station. The computer then consults its memory as to the correct amount of food to be dispensed to that particular animal and supplies the food. This information can then be correlated with the amount of the milk produced by the cow, and her feed allotment can be increased or decreased as necessary.

However, this system still has significant room for improvement. For example, the amount of milk given by a particular cow is determined by weighing. This process has now been computerized to the extent that electronic weighing devices are available which weigh the milk and record the amount, cross-indexed to the identification of the cow, such that the correlation is computerized. However, the electronic weighing apparatus made available to date is quite cumbersome and expensive.

To date there has been developed no fully automatic milking machine, i.e., in which no human is required to attach the milk receptacles to the udders of the cow. Accordingly, a farmer is still required to assist each cow with milking, and must be in the proximity to the cow during the milking process. This being so, the complex and expensive electronic weighing devices can be dispensed with as a means of data entry if the farmer can instead be provided with a simple way of entering the amount of milk produced by the cow into the computer. That is to say, if the farmer can be enabled to enter the amount of milk taken from a given cow on a particular day without substantially complicating his tasks, the complex and expensive weighing device can be eliminated, with substantial economies thus realizable in the dairy industry.

It is accordingly an object of the invention to provide an apparatus for the measurement of the milk output by a cow in a given milking session, wherein the fact that a human operator is of necessity in the vicinity of the cow after the milking operation is utilized, yet in which the additional duties required of the human operator are relatively small.

It is another object of the invention to provide means and apparatus for measurement of milk output by a cow in a given milking session in which actual weighing of the milk is avoided, and in which the weight data is provided in a form which is directly acceptable by a computer, without necessity of a human operator's making note of the amount.

As is well known, recent developments in bar code technology have rendered bar codes useful in ever-widely expanding fields, just as in the case of computers, as discussed above. The prior art shows numerous new applications for bar code technology. The invention of Ser. No. 579,722 provides an additional such new use, identification of dairy animals by bar code reader. Use of bar codes to identify dairy animals according to that invention required that the prior art bar code labels be improved to be more durable, fool-proof and easily installable than had previously been possible, and this was accordingly an object of the invention of another copending application Ser. No. 733,554 filed May 13, 1985. Both these copending applications are incorporated by reference herein.

The ultimate object of the invention is to provide systems for data entry in agricultural and other applications using bar code technologies, in which bar codes are used to provide input to computer systems concerning, for example, quantities of materials, as well as identification of the location, source or other attribute of the materials, so that a computer can be directly provided with information as to, e.g., the amount of material stored in a given vessel, the identification of the material and of the vessel, and the like, all without requiring the operator to manually input the data.

SUMMARY OF THE INVENTION

The needs of the art and objects of the invention mentioned above are satisfied by the present invention which in the agricultural environment comprises a system and methods for correlation of a given cow with the amount of milk produced by her in a particular milking session. Several embodiments of the invention are shown. In a first embodiment, a durable bar coded strip is semi-permanently attached to the animal, e.g., as a cuff around its hind leg. The major portion of the band forming the cuff has the bar code identifying the animal permanently imprinted thereon, such that the animal can be identified by a farmer wanding the bar code. Portable bar code wanding equipment is now available so this poses no technological problem. This identification can be used for a wide variety of purposes. Another use of bar coding in the agricultural environment is provided according to another aspect of the invention, wherein a bar coded scale extending vertically is affixed to a milk collection container, as conventionally used. The vertically extending bar code is divided horizontally into a large number of differing sequential bar code segments, the value encoded in each segment indicating the amount of milk in the container when filled to the level of the particular code segment. A transparent window is provided in the container. Thus, for example, in order to enter a number representative of the pounds of milk output by a given cow into a computer memory, the farmer need simply wand the bar code at the level of the milk within the container. This can automatically be correlated with the identification of the cow, wanded as previously discussed, to provide the required information to the computer. The computer can then use this information in any number of varying calculations such as optimization of the feed provided to the animal, and the like.

Laser technology is also used in reading bar code. In a particularly preferred application, a laser scanner is used to read the bar code fixed to the milk container. If the bar code is substantially translucent and is juxtaposed to a similarly translucent window, or to a plastic milk container, the contrast between the bars and the background of the portion of the bar code between the bars, i.e., the spaces, juxtaposed to the milk will be different from the contrast where juxtaposed only to air, such that the laser will be able to read the bar code only where milk is behind the bar code. The laser scanner, if programmed to scan downwardly and locate the first readable bar code, can thus itself locate the level of the milk in the container and read the corresponding bar code from the label placed thereon, without human intervention.

More broadly stated, the invention comprises all manner of providing machine-readability for instrument systems of the type in which a pointer or other indicator is juxtaposed to varying visually-readable indicia in response to a physical quantity. Machine-readability is provided according to the invention by providing a bar-coded scale, comprising a number of bar-code segments, each encoding a number corresponding to the physical quantity, juxtaposed to the indicator, and by providing means for ensuring that a bar-code scanner reads only the correct segment.

BRIEF DESCRIPTION OF THE DRAWINGS

The invention will be better understood if reference is made to the accompanying drawings, in which.

BRIEF DESCRIPTION OF THE PREFERRED EMBODIMENTS

Figure 1:
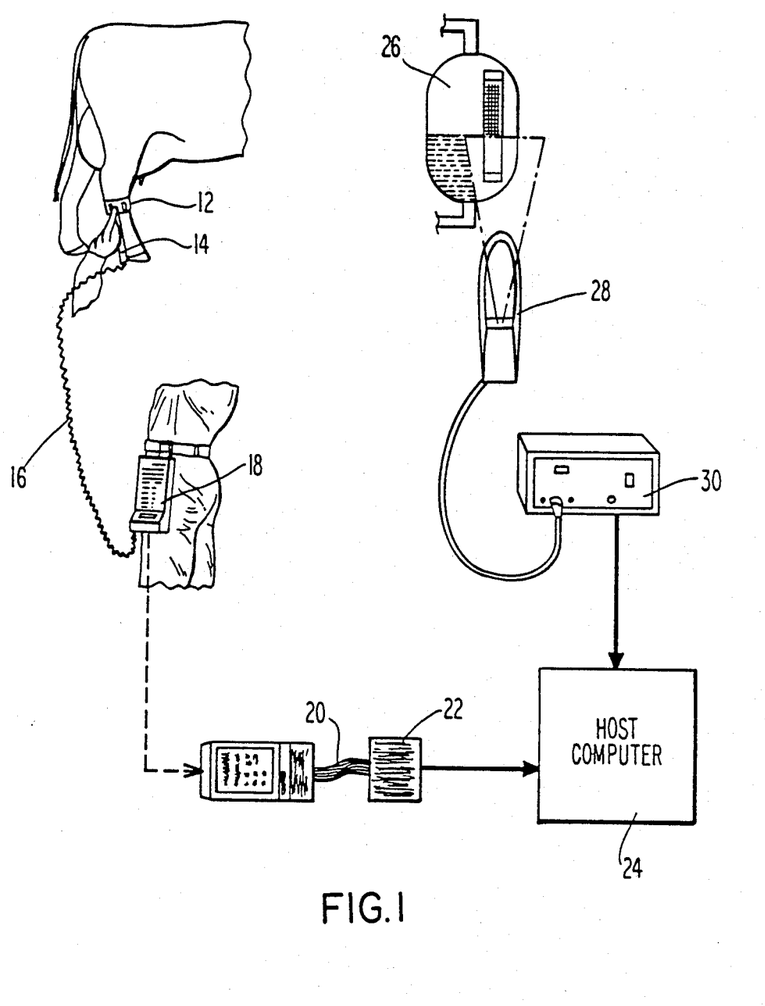
FIG. 1 shows an overview of the system of the invention with several alternatives depicted.

A system according to the invention as applied to identification of a cow and its correlation to the amount of milk given by her in a milking period is shown generally in FIG. 1. A leg band 12 affixed to the leg of a cow is scanned by a farmer using an infrared bar code scanning wand 14. According to the invention of copending Ser. No. 733,554 filed May 13, 1985, this leg band is replaced by a tail band, and such is to be considered an alternative embodiment throughout the present discussion. In one possible embodiment of the invention, the wand 14 is connected by a flexible cord 16 to a bar code reader 18 which is, for example, carried on the farmer's belt. Such bar code readers are commercially available. For example, the Model 9410 bar code reader from Intermec of Lynnwood, Wash. using their Model 1236 infrared wand would be suitable in this application. The data thus read is stored by the reader until at a subsequent time it is connected by way of a multiple conductor cable 20 to a reader interface and battery charger 22 for example that available from Intermec under Model No. 9401, and thence connected, using, e.g., the conventional RS-232C interface protocol, to a host computer 24 which can be any of a number of suitable units, such as the Apple II, the IBM Personal Computer, Radio Shack TRS-80 and others.

The cow identification data, as mentioned, is designed to be correlated with the milk production data. This can be generated according to the invention as follows. A conventional weighing vessel 26 is used in dairy operations to collect the milk output by a given cow in a milking session. Presently, the contents of such vessels are measured by visual comparison to a scale affixed to the outside of the tank 26, or by electronic weighing devices.

The former is time consuming, as in all but the smallest operations the farmer must make a note of the amount of milk, and is subject to human error, while the latter involves very substantial expense. According to the present invention, a vertical strip having a sequence of horizontally-extending bar code segments printed thereon is affixed to the outside of the tank. The tank is made of a translucent material or is provided with a translucent window so that the level of the milk within can be detected by eye, or by machine, as will be discussed below. If the operator desires to input the milk volume, he simply aligns the wand of the infrared bar code reader 14 with the level of the milk and scans across the bar code segment at that level on the strip, thus providing an input to the reader 18. The reader can be programmed to store this amount along with the cow identification, for subsequent "dumping" to the host computer 24 as discussed above. The bar codes used for animal identification and milk quantification can readily be selected to be differentiable from one another by the reader 18, as understood in the art, so that the order in which they are scanned is not critical. These statistics can then be monitored and used in calculation of, e.g., feed amounts for subsequent feedings, or for detection of diseases and other conditions such as "animal in heat" from which it may be determined that the cow may be ready for artificial insemination, and the like.

A second method of inputting data is generally similar but employs a hand-held laser scanner 28, such as, for example, the Intermec Model 1600. This has several advantages, mainly that no physical contact between the scanner and the bar code is required, which may be useful in some applications, especially with bands attached to hind legs, preventing the damage due to the animal's kicking during the scanning procedure; this would also reduce wear on the labels. This laser scanner 28 could also be used to monitor the cow identification tag 12. As a rule, of course, it would be undesirable to have two different scanners at the same work station. The laser scanner can be conventionally connected to a suitable reader 30, e.g. the Intermec Model 9500 which is again connected by way of an RS-232C serial interface to the host computer 24.

Another option would provide automatic detection of the amount of milk in the vessel 26; that is, not requiring the operator to scan across the bar code segment at milk level. This could be accomplished by printing the bar code segment on a strip of substantially translucent material such as Mylar (trademark of DuPont Corporation) and juxtaposing it to a translucent window in the vessel 26. Alternatively, the entire vessel could be made of a translucent plastic such as polyethylene or the like. It will be understood that the contrast between the printed dark lines of the bar code and the translucent plastic is such that a contrast in background will be observed between the bar code segments behind which milk is present and where it is not; that is to say, the white milk provides good background contrast up to its level in the vessel. It is envisioned that a laser scanner as at 28 could be permanently mounted in juxtaposition to the vessel 26 for detecting the change in contrast at the level of the milk and for reading the bar code data at that level, thus eliminating the need for the farmer to wand the data or to scan the vessel. Similarly, laser scanners could be used to identify the animals entering the milking parlor. The necessity of the farmer's wanding the cow identification band 12 would thus be eliminated. Other sorts of cow identification devices, such as radio transponders or the like are also suitable; such devices are in the prior art and are conventionally understood in the industry.

Figure 2:
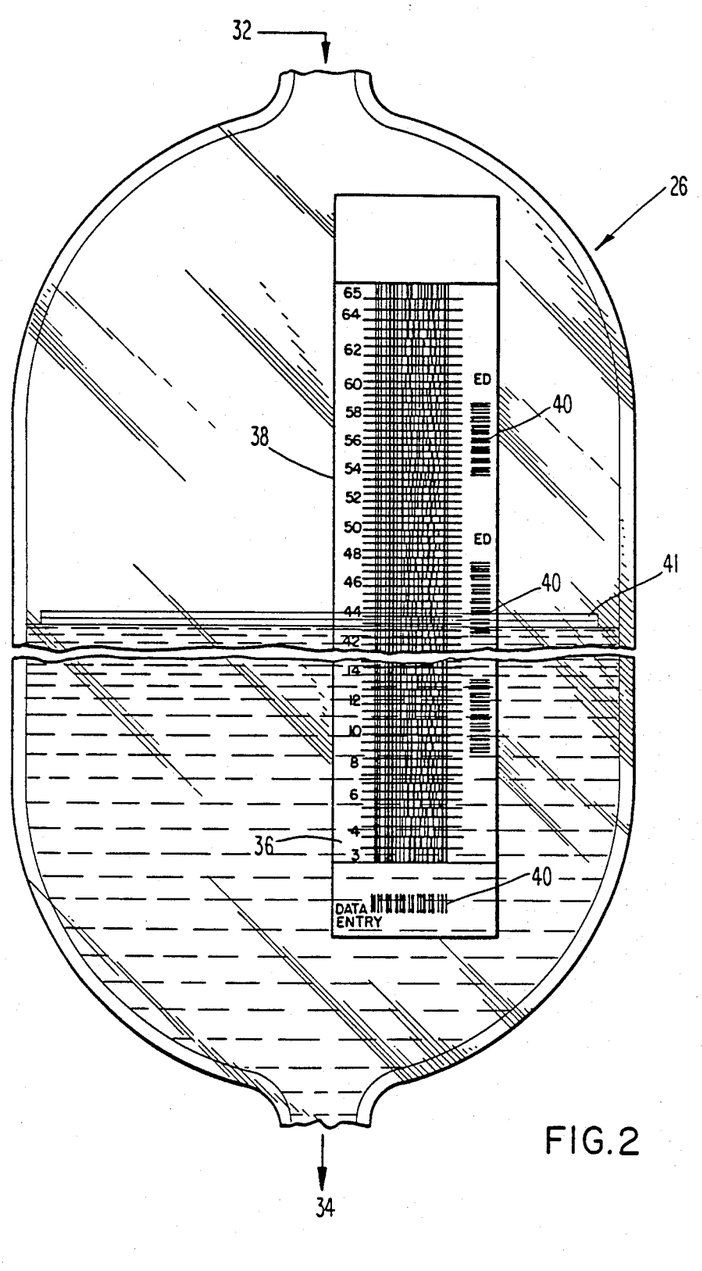
FIG. 2 shows how a bar code scale may be applied to a milk container having a translucent window for easy bar code identification of the level of milk therein.

FIG. 2 shows some additional details of the vessel 26 in which the milk obtained from a cow in a milking session is stored. Typically the milk will be input at the top of the vessel 26 as at 32 and will be drained therefrom at the bottom as indicated at 34, when milking has been completed. As mentioned, the vessel 26 is to be provided with a translucent window 36 or may be formed entirely of translucent material, such as polyethylene, glass or the like. Affixed to a translucent portion of the vessel 26 is a label 38 on which are printed a number of bar code segments, each segment encoding the number of pounds of milk in the vessel when its level reaches the corresponding bar code segment. Thus, for example, at the height within the vessel reached by an amount of milk weighing 29 pounds, a bar code segment representing the number 29 is located. The farmer can then simply move his wand 14 across the bar code segment at the level of the milk and the data will be automatically entered into the reader 18.

It is typical in the art for bar code readers to provide an audible tone when a bar code has been read successfully. When this signal is given, typically the operator will then wand an additional code 40, indicating that the bar code read by the wand is to be stored. These additional codes can be provided at plural locations 40 on the label as shown and may be marked, e.g. "Data Entry." An essentially similar procedure is followed whether an infrared wand 14 or a laser scanner 28 is used. The Data Entry codes 40 could also be used to provide an identification of the vessel.

As mentioned above, when milk in the translucent vessel is juxtaposed to bar code segments printed on a translucent material, a much better contrast between the black lines of the bar code and the background is realized, than in the region above the level of the milk. This can be utilized in automatic reading of the level within the vessel 26, by adjusting the detection threshold of the scanner such that it can only successfully detect codes at the higher contrast, and programming the laser scanner to be scanned downwardly over the vessel 26 and to store the first bar code legibly detected, that is, the highest segment having milk behind it. Such programming of the scanner is well within the skill of the art. This adjustment of the level threshold can also be utilized to differentiate between milk and the foam "head" on the milk; optimization of the size of the spaces, to be approximately equal to the size of the average bubble would also assist in solution of this problem. Another solution would be to employ a float 41, having a high-contrast surface, e.g., a white band against a black background, which would be easily distinguishable from the foam, and would float on the liquid milk, beneath the foam.

It will also be appreciated that bar code measurement of the contents of a vessel has applications far beyond agriculture, and that if the level of clear liquids is to be monitored by scanning, a float 41 can be used to provide a ready reference mark.

Figure 3:
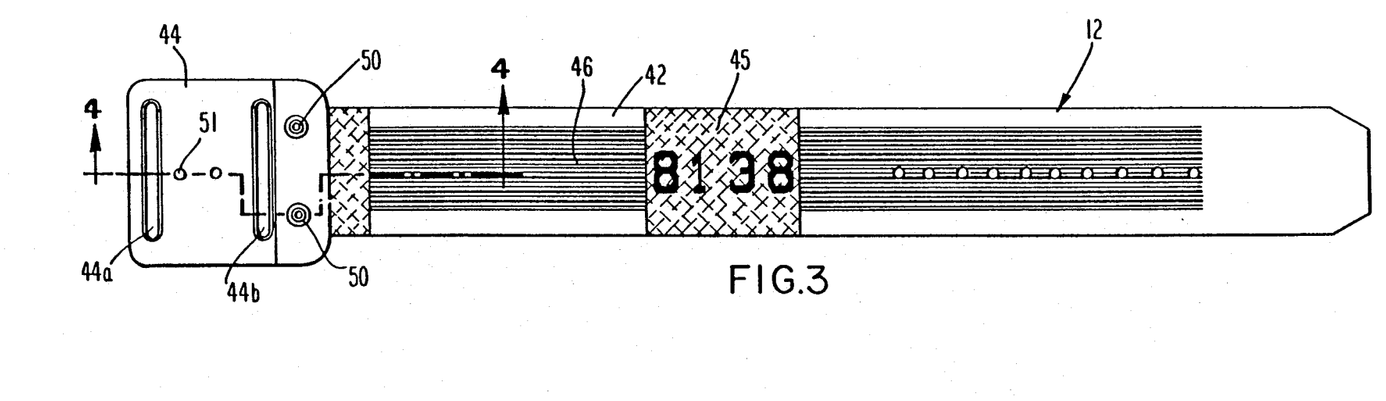
FIG. 3 shows how the band attached to the animal for identification purposes can be constructed.

FIG. 3 shows a general view of a typical bar code bracelet which can be attached to the leg of a cow, as shown in FIG. 1 at 12. Obviously, such a bracelet can be attached at other portions of the animal; the neck and the tail are clearly suggested. Similarly, bands such as shown may be of use in other applications throughout industry, e.g., in labeling of pipes, bundles of cables in the telephone system, and in other electrical cable applications. Bar code identification of piping, for example, would be especially useful in situations where verbal identification would not be of assistance to a repairman, for example, in a power plant or the like, where the very complexity of the system would make the verbal identification of a pipe essentially useless. For example, bar code identification could be used in the field to identify a particular pipe on a schematic diagram much more readily than would a simple indication of its contents. Accordingly, it should be recognized that the bracelet shown in FIG. 3 has applications beyond dairy animal identification as described above.

The basic bracelet 12 comprises a band portion 42 and a buckle portion 44. The band portion is shown expanded in FIG. 4a which will be discussed below. In general it comprises a tough, flexible substrate having an elongated bar code permanently printed thereon, shown at 46, suitably protected against weather and the elements, particularly important in the demanding barnyard environment, and provided with additional means for visual identification as necessary. For example, in the example given in FIG. 3, the number encoded by the bar code is 581383. The number 8138 appears on a label 45, which is lined for the color orange. Obviously, other colors, selected for high contrast with the black ink used for printing, could be used. The other digits of the six-digit code number can be used for other coding purposes as desired by the farmer; for example, all bands having the first digit equal to 1 could be used on cows born in 1983; number 2 bands could be used on Holsteins, number 3 bands on Guernseys and so forth. Similarly, the last digit, here shown as a 3 could be used to encode any other desired data concerning the animal in question; this digit might be selected to correspond to the orange tag color, which similarly is indicative of some characteristic of interest.

Figure 4:
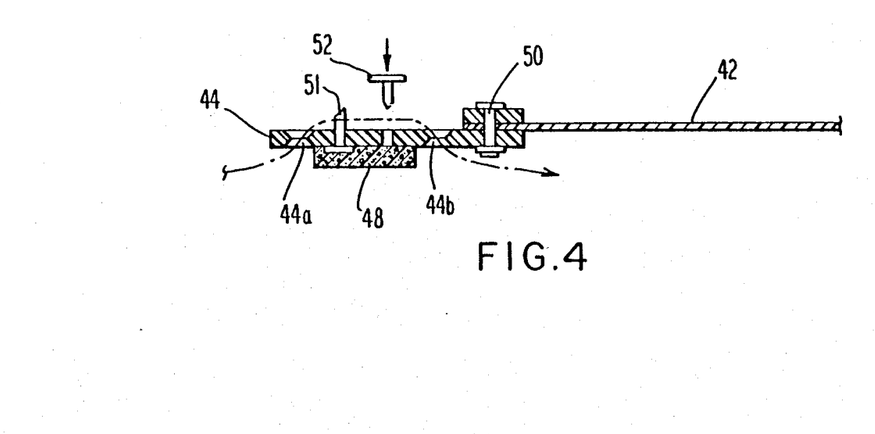
FIG. 4 is a cross-section taken along the line 4—4 of FIG. 3.

As shown in FIG. 4, which is a cross-sectional view taken along the line 4—4 of FIG. 3, the band 42 is passed through slots 44a and 44b in the buckle portion. A neoprene foam pad is attached at 48; this prevents chafing of the band against the animal's leg and prevents it from moving down the leg into the mud zone around the hoof. At one end, the band 42 is affixed to the buckle 44 by one or more stainless steel rivets 50, or the equivalent. Its other end is passed through the two slots 44a and 44b and is held in position by a permanently attached rivet 51. The resilient and relatively stiff nature of the band material (discussed in detail below) holds the band on the rivet 51, but it can be flexed sufficiently to allow removal, if desired. On the other hand, if permanence of the band's installation on the animal is required, e.g., for breeding registry purposes, this can be readily achieved by use of a second rivet 52, which may be attached by epoxy or the like; to remove this rivet will destroy or damage the buckle, indicating that it has been tampered with. Staples of stainless steel or other durable material could also be used to complete the band's end-to-end connection.

Figure 4A:
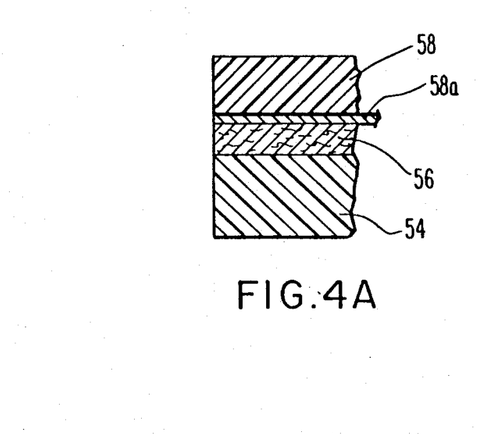
FIG. 4a is an enlarged view of a portion of the cross-section of FIG. 4.

FIG. 4a shows an expanded view of the structure of the band portion 42. It comprises a base layer 54 which may be a 10 mil Mylar strip. A layer of double-sided cloth carpet tape is then applied at 56. This is used to adhesively affix a second 7 mil thick clear Mylar strip 58 having the bar code and the ID label printed on one side 58a thereof. After application of the bar code and the ID label to side 58a, a coat of paint, white or some other desired high contrast color, is applied, preventing the bar code from being destroyed if delamination of the strip occurs. The painted surface is then attached by way of the cloth carpet tape 56 to the support strip 54. The assembly can then be riveted by rivets 50 to the buckle member 44 which can readily be formed of ⅛ inch polyvinylchloride plastic sheet. As mentioned, the other end of the band can then be attached to the buckle by pins 51 and 52; use of pins which cannot be removed in order to provide permanent animal identification is useful for breeding and registry purposes. These pins can be formed with barbs on their surface for interaction with the holes in the buckle member 44 so as to prevent removal and can be formed of durable materials such as plastic, brass or stainless steel. Alternatively, the buckle assembly can be dispensed with in favor of simply stapling the band so as to encircle the animal's leg.

Printing of the bar code along the total length of the band provides almost 360° of availability of the bar code to a scanner, which is very convenient for rapid scanning. This also prevents any one area on the band from being worn out due to frequent scanning in the same place, and permits scanning even if a portion of the bar code becomes obscured or unreadable for some reason. Desirably, the ID label text and the bar code itself are computer generated and printed directly on a master Mylar film. This can then be reverse copied onto the 7 mil upper layer of Mylar 58, in a conventional photocopy process. The color coating of the label area and high contrast coating in the bar code region will serve to prevent destruction of the label text and the bar code in the event of delamination of the band, e.g., due to aging of the carpet tape or other adhesive medium used. The coating can be paint or colored tape. After construction as described above, the band is preferably formed in an oval by placing the laminated band around an oval wooden mold and baking, e.g., for 15 minutes at 160° F. After the band and mold is removed from the oven it retains this oval curvature permanently, which reduces stress on the band and reduces the chance of delamination. It is envisioned that eventually more advanced techniques could be devised for manufacture of the encoded strip; ideally, the operator would simply input the desired number on a keypad and a programmed computer device would control a dedicated printer to generate the appropriate bar coded strip. It is believed that such devices are within the skill of the art, although the inventor herein is not aware of any presently available devices of this type.

It will be recognized by those skilled in the art that other methods of manufacture of an identification bracelet carrying bar code information are possible. For example, a base strip material of a flexible vinyl material on the order of ⅛ inch thick can be used. This is spray painted after proper cleaning. Use of a white epoxy primer paint such as that sold under the tradename "Zynolyte" appears appropriate. The bar code can then be printed directly thereon using high carbon inks. A thin clear vinyl film can be applied over the bar code to prevent it from being destroyed, e.g., by scratching or the like. Other buckle structures are similarly possible.

The selection of the bar code used is also a matter of design choice. The inventor personally favors the industry-standard "interleaved" 2 of 5 code, with which a wide variety of commercially available equipment is designed to cooperate.

Those skilled in the art will recognize that the choice of scanning device has some bearing on the materials selected for use in the bracelet according to the invention and also on the bar coded label applied to the milk vessel. If an infrared scanner is to be used, which is desirable to reduce interference from ambient light and to provide improved signal-to-noise ratio, the vinyl, Mylar or other substrate material used must absorb sufficient ink to give reliable, infrared bar code detection. Use of carbon inks is indicated because the cow will be outside a substantial amount of time, so that an ink having good resistance to ultraviolet radiation damage from sunlight is clearly indicated. As mentioned, the inventor has found that a flat, white epoxy primer paint sold under the tradename "Zynolyte" is a useful background coating. This paint is available in a number of contrasting colors which can be used for additional identification of the animal by characteristics, e.g., breed, source and the like. As mentioned, colored tape could be used as background.

Those skilled in the art will recognize that there are additional ways of making durable bands having bar code animal identification printed thereon. Similarly, wide variation in effective buckle design is possible, and the bar codes used can be adapted to a wide variety of actual requirements. In particular, copending application Ser. No. 733,554 filed May 13, 1985, discloses a number of additional improvements in bar-coded bands.

Those skilled in the art should also recognize that the methods and apparatus described herein have application to industrial uses other than in agriculture. For example, the level of a wide variety of liquids in vessels and the like can be readily and accurately monitored by affixing thereto a bar code readable label such as shown in FIG. 2 and providing a workman with an infrared or laser scanning device. A bar coded label could similarly be juxtaposed to a conventional sight glass. As mentioned above, in some environments it will be possible to adapt the laser scanner or wand to read the bar code of the level directly, without operator intervention. Similarly, it would be useful and readily feasible to have a user scan a bar code identifying the vessel at the same time he scans the bar code indicating the liquid level within the vessel, thus identifying the vessel and measuring its contents in a single operation, analogous to identification of a cow with the amount of milk received from her in a given period. In this way, for example, an operator could provide a correlation between a vessel number and the level of its contents by simply scanning a single bar coded label, where the vessel number or location is given within the level scale without ever having to explicitly note which vessel contents he was measuring nor himself noting the actual liquid level therein, thus greatly simplifying the procedure and reducing the chance of human error. This would be a particularly useful method of monitoring complex laboratory processes, e.g., in the biotechnology field, where a large number of standardized glass vessels, e.g., the typical frustoconical "Dewar" flasks, are used. It would be a simple matter to generate standard bar code label scales having their segments spaced in accordance with the variation in volume per unit spacing due to the conical shape of the flask, and provide these labels corresponding to the conventionally sized flasks, e.g., 200, 500, 1000 and 2000 ml. Such labels could readily be provided with adhesive backing so as to be adhesively affixed to the flasks. Similarly, it would be straightforward to provide a device which would print a bar code label in response to an operator input of a text identifier and/or code number, e.g., NUTRIENT MEDIA: CODE NO. 4621 could be input, and the bar code for "4621" automatically generated. Such a label could then be adhesively attached to the appropriate flask upon set-up of an experiment. Thereafter, monitoring the experiment would be a simple matter of wanding or scanning the label on each flask and the bar code scale segment at the level of the liquid in the flask.

Similarly, segmented bar code scales could be juxtaposed to thermometers, for scanning of temperature, to provide additional input; this might well be cost effective when compared to conventional combinations of thermocouples and analog-to-digital converters, now used for automatic input of temperature data to a monitoring computer.

Ultimately, it can be envisioned that bar-coded labels standardized to match conventional flasks and thermometers, as well as other calibrated quantities, could be sold together with identifying bar coded labels, appropriate scanning equipment, and computer software. When a given experiment is being set up, the appropriate bar coded labels would be attached to the various flasks, and other apparatus, and the correlative identification information input to a suitable computer. When the experiment is thereafter run, its progress could be monitored by simply wanding the bar codes representing the analog values and the identifying labels at intervals. The computer could then correlate the bar code segments read with the identifying information and could even graph the results, perform statistical analysis and so forth, all without any operator's ever having to note a volume, record a temperature, or even identify a flask. Bar code labels could also be printed to be juxtaposed around circular dial faces; the bar code segments would extend radially for scanning at the position of the indicating needle.

Finally, it should also be realized that automatic scanning of bar code labels indicative of volume, vessel identification, temperature, as well as other process parameters and variables, is intended to be within the scope of this application.

FIGS. 5-14 show additional problems and solutions encountered in providing machine-readability by way of bar code to various analog instrument systems. Broadly speaking, the problems encountered involve encoding one or more digits, the value of each of which may be indicated by a separate moving needle such as in a conventional kilowatt/hour meter or gas meter, and ensuring that the combination of scanner and bar coded instrument is essentially foolproof, such that no particularly difficult demands, for example, accurate alignment of the scanner with the proper bar coded segment, are made of the operator.

Figure 5A:
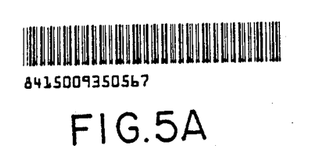
FIGS. 5A–5D illustrate certain difficulties in breaking up a multi-numeral bar code.
Figure 5B:
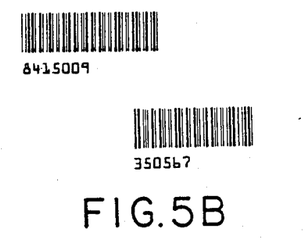
Figure 5C:
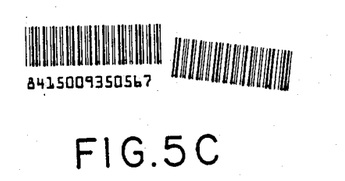
Figure 5D:
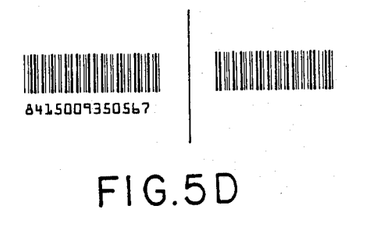

Prior to discussing specific applications, some additional detail concerning bar code, particularly bar coding encoding of single digits, is desirable. FIG. 5A shows a typical bar code which encodes a number, in this case, 13 individual digits. Most bar code encoding methods do not allow individual ones of these digits to be read by a scanner; for example, some digits are encoded by the variable-width lines and others by varying spaces between them. Accordingly, it is not possible to read the lines in absence of the spaces. Furthermore, FIG. 5B shows the two parts of the bar codes of FIG. 5A broken into two parts. In many codes, these segment portions cannot be read separately. FIG. 5C and 5D both show imperfectly reassembled segments; neither of these will be read correctly by a conventional scanner. (Those skilled in the art will recognize that scanners either comprise or are operated in conjunction with decoders, which are programmed by a user to recognize the various code types. Throughout this discussion, use of the term "scanner" is meant to include all manner of combinations of scanners and decoders.)

It will be appreciated by those skilled in the art that there are a number of different bar code conventions, each of which has varying applications and uses. The present discussion, however, will focus on the so-called code 39, which is an alpha-numeric code according to which a separation is provided between individual characters or digits. Even with the space, it is difficult to achieve proper alignment of multiple character sets, particularly when, for example, the individual characters are on mechanical parts which move relative to one another. One solution to the alignment problem is to insert a large space between the characters which makes alignment less critical. Conventional bar code scanners can be modified to ignore this large space by changing their decode algorithm. If the space is made relatively wide, e.g. five times the width of the narrow space separating bars in the bar code, the scanner will simply ignore the space and read the code in normal sequence as if the parts were joined together. (Within a typical bar code segment, the wide bars and spaces are between two and three times as wide as the narrow bars and spaces, respectively.)

Figure 6A:
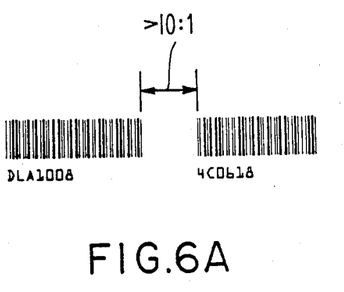
FIGS. 6A and 6B illustrate certain problems encountered in reassembling segments of bar codes.
Figure 6B:
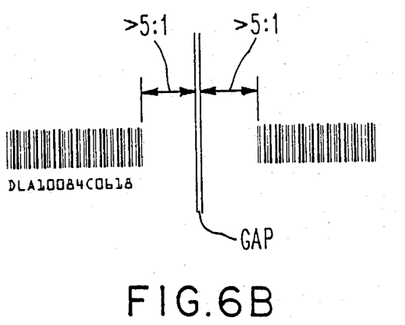

FIG. 6A shows a code 39 segment with a large space, greater than ten times the width of the narrow space separating the bars between its two portions. In some applications, the portions may be on separate modules and can be joined by moving the modules in close proximity. However, even when carefully reconnecting the modules, there will always be something of a gap as shown in FIG. 6B. The scanner can be programmed to ignore such a gap between two large spaces; in the example shown in FIG. 6B, the large spaces are greater than five times the size of the large gap between bars.

Another common symbology, referred to as interleaved two of five (2 of 5) encoding, uses a different method to separate digit units. In this code, digit units occur in pairs. One digit uses the bars for code information while the second digit is encoded by the spaces between the bars. Interleaved 2 of 5 is only numeric but is the most compact code, providing the same number of digits in one-half the space for a given bar code width than does code 39.

Figure 7A:
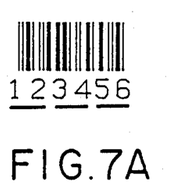
FIGS. 7A–7C illustrate the use of so-called interleaved two of five bar code to represent multiple digits.
Figure 7B:
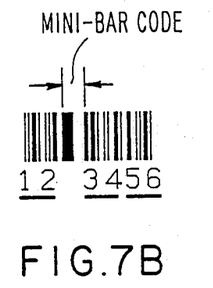
Figure 7C:
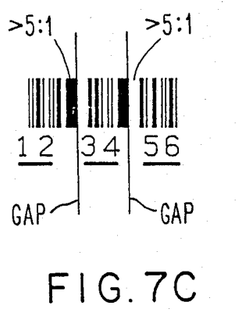

Interleaved 2 of 5 code does not use a space to separate characters but does require each two-digit unit to directly interface with the next unit set. FIG. 7A shows a six-digit interleaved 2 of 5 bar coded label with three sets each of two digit units. FIG. 7B shows how the digit units may be separated while retaining the code information in adjoining units. Here, the separation is itself is a bar code composed of an extra wide bar, more than five times as wide as the narrow bar, followed by an extra wide space, five times as wide as the narrow space. This "mini-code" is easily recognized by the scanner which can be programmed to ignore the mini-code, continuing the decoding of the digit units without interruption. This type of mini-code can be interposed between any set of digit units as shown in FIG. 7C.

The real benefit of digit unit separation by use of mini-codes or the equivalent is to provide tolerance, such that multi-digit bar codes can be broken up and attached to varying relatively moving parts, such that numbers of more than two digits can be encoded and scanned reliably. Furthermore, using such mini-codes as "separators" and by programming the scanner to look for them, so as to only give a "good read" signal upon their detection and by arranging the segmented codes such that only one mini-code is provided for each moving code portion, detection can be made substantially foolproof, as only one segment will be read per portion. Moreover, it is possible to also provide indication of the source of the data, e.g. an identification of the meter or other instrument being scanned, at the same time the code encoding the value of the analog quantity indicated by the instrument is being scanned.

Figure 8:
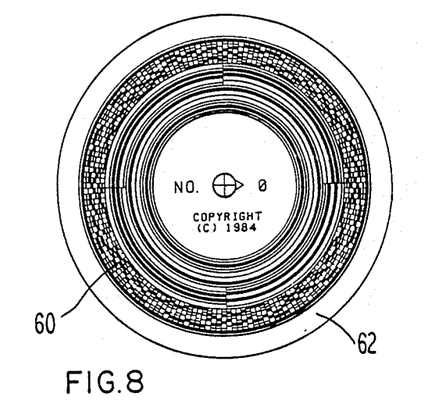
FIG. 8 shows a bar coded scale which can be juxtaposed to a pre-existing rotary meter.

FIG. 8 shows a generally circular bar code label for use with a milk weighing instrument. The scale of the milk weighing instrument comprises a dial reading from zero to 40 lbs. in one-quarter pound increments, in which a pointer travels around the scale as milk is produced. The scale shown in FIG. 8 comprises a number of individual bar code segments 60 each encoding one of the combinations of digits required (in this case, 160; 40 lbs.×0.25 lb/segment). These segments are disposed around a central bar code 62 which may indicate the identification of the scale (e.g. "Meter 42"), or as shown by the variation of the bar code in the four quadrants of the dial, provide additional bar code information, e.g. the tens digit, or the like. It will be appreciated by those skilled in the art that it is necessary to allow the scanner to only read the proper segment, in order to reduce operator errors or the like. This can be accomplished by attaching an opaque window, with a slit in it just wide enough to allow the scanner to read a single segment, to the pointer for rotation therewith. In this way, the scanner will only be able to read a single complete bar code, at the location of the window.

Figure 9:
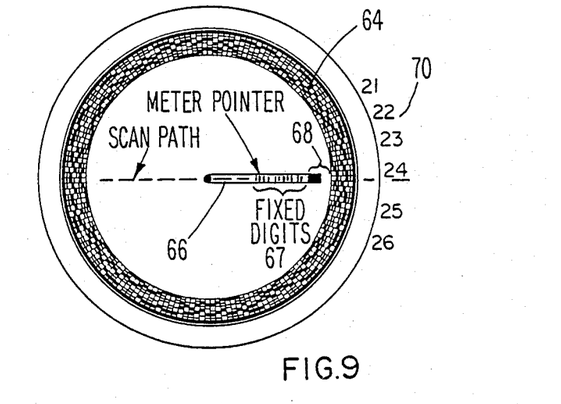
FIG. 9 shows how this rotary meter can be adapted to work with the rotary scale of FIG. 8.

FIG. 9 shows an alternate way in which a circular dial meter can be converted to machine-readability by use of bar codes. In this case, an outer ring of bar code segments 64 generally similar to those described at 60 in FIG. 8 is disposed around the outside edge of the meter. The meter pointer 66 has attached to it the remainder of the bar code required for reading. As shown, this may comprise a number of fixed digits 67 which can, for example, indicate the identification of the meter so as to provide an association of the data read from the outer bar code scale 64 with the source of the data. Also shown in FIG. 9 is provision of a mini-code 68 comprising a wide black bar, at the end of the meter pointer 66, juxtaposed to a white area formed either on the meter face or as part of an opaque dial disposed between the meter face and the meter pointer. The meter pointer 66 also points to visually-readable indicia 70 disposed around the outside of the meter in the conventional fashion. In this way, the operator can read the meter visibly while the bar code scanner together with the additional bar code scale and the bar code on the meter pointer, provides machine-readability of the data.

As explained above in connection with FIG. 7, it is a simple matter to program today's code scanners so that simultaneous reading of a large number of bar code segments, properly aligned and connected, e.g. comprising the fixed digits and the variable digits provided by the bar code segments 64 along a single "scan line" are required before a "good read" will be indicated. By requiring the scanner to simultaneously read the fixed digits and a single segment of the bar coded ring 64 in a single scan, one ensures that the segment lined up with the meter pointer is that which is read. Additional codes may be provided for insurance' sake, e.g. a "quiet zone" provided by the white meter face. Again, programming of the scanner to require the correct combination of the fixed digits 67, the mini-code 68, one of the segments 64, and a quiet zone, is well within the skill of the art.

Figure 10:
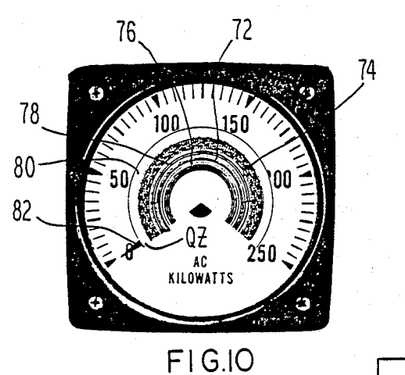
FIG. 10 shows one way in which a pre-existing meter can be adapted for bar codability.

FIG. 10 shows another way in which a conventional rotary dial instrument can be adapted to machine-readability. In this case, a circular bar-coded dial 72 comprising an outer ring 74 of individual bar-coded segments, the number of the segments corresponding to the amount of precision desired, is disposed around a central bar coded ring 76, which is continuous all the way around the dial, thus being used to provide an indication of meter's identification, and a section divided into quadrants 78 which may be used to provide a different digit than the outer ring 74. A circular quiet zone 80 is provided between the segment ring 72 and a black instrument needle 82. The scanner can be programmed to in effect use the black needle 82, in combination with the quiet zone as the identification of the segment to be read. The scanner will thus automatically be controlled to only read that segment directly opposite the needle 82; in effect, the needle becomes part of the code. The length of the needle can be used by properly programmed decoders to distinguish it from the visually-readable indicia shown.

Figure 11A:
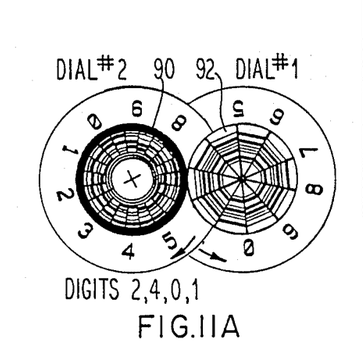
FIGS. 11A and 11B shows how multiple dial meters can be converted to machine-readability using bar codes.
Figure 11B:
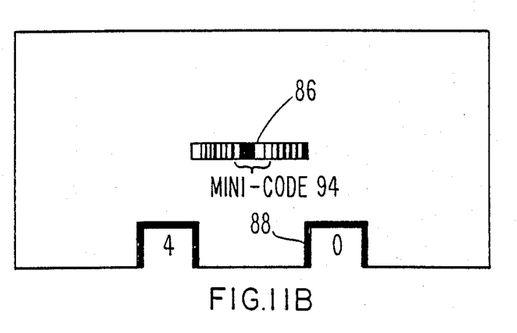

FIG. 11, comprising FIGS. 11A and 11B, shows how multiple dial meters, such as gas meters or electric meters, may be converted to machine-readability using bar codes. In such meters, a number of individual dials are geared to one another, usually by gear ratios of ten to one, so as to record extremely high numbers, e.g. on the order of millions of cubic feet in the case of gas meters, yet to provide very high resolution, down to one cubic foot in the gas meter case. One constraint which must be noted in connection with these utility meters is that a constant load must be provided to the measurement transducer; in effect, the geared dials must provide a constant physical resistance. This means that use of a "carry" wheel, such as provided in an odometer or the like where the tens digit only moves upon movement of the units digit from nine to zero and so on would not be suitable as this would introduce a varying resistance to the movement of the gears. It will also be appreciated in this context that machine-readability would be highly undesirable because this would require requalification of the meters by the utility commissions and the like. Furthermore, what might otherwise appear to be a straight-forward solution, to provide an individually bar-coded, and hence machine-readable, dial for each of the individual meter dials having wedge-shape segments, each segment encoding a number from zero through nine, and an identification of the relative significance of the digit encoded by the dial, and to provide a window over the moving dials to provide camera access, is not directly usable. The difficulty with this approach is that ambiguities are encountered when the least significant digit goes from nine to zero, as then a line separating the segments of the dial encoding the more significant digit would line up with the line separating the nine and zero segments on the dial encoding the less significant digit.

The solution to this problem is shown in FIGS. 11a and 11b. A two-dial example is given. The right hand dial is divided into ten segments; each encodes a number indicating the units value, from 0–9, and a number indicating the significance of the digit. The lefthand dial is divided into twenty segments. Each of the twenty segments encodes a first digit indicative of the significance of the digit encoded by the dial. The second digit encodes the unit value, from zero through nine. The digits are divided into ten pairs, each pair corresponding to the unit value encoded by the second digit; the third digit indicates the relative position of the individual wedge within its pair. Thus, the value of the third digit corresponds to whether the less-significant dial's value is more or less than five at any given time.

For example, suppose the third digit is either 0 or 5, and the relative significance of the digit encoded by the dial is two. The first five wedges would then encode 2-0-0, 2-0-5, 2-1-0, 2-1-5, 2-2-0, through 2-9-0, 2-9-5. In this way, each of the twenty individual wedges of the dial encoding the more significant digit is either encoded as being in the beginning or the end of its unit digit value. The combination of this "high" or "low" value, with the actual value therefor provided by the less significant digit dial provides an unambiguous indication of the value to be provided for the more significant digit.

For an additional example, if only ten digit wedges were encoded for each of the two dials, at the transition of the more significant digit from four to five, and hence of the less significant digit from nine to zero, the possible combinations would be 4-0, 4-9, 5-0, and 5-9. By instead encoding the dial of the more significant digit to provide "low" and "high" halves of each of the segments of the more significant dial, and symbolizing these as 4.0, 4.5, 5.0 and 5.5 respectively, the ambiguities at the 4 to 5 transition are 4.5-9, 4.5-0, 5.0-9 and 5.0-0. However, the 4.5-0 and 5.0-9 combinations are obviously mathematically inappropriate. The only ambiguity is between 4.5-9 and 5.0-0 which are essentially the same. Hence the ambiguity is resolved. FIG. 11B shows how these dials can be placed behind an opaque panel having a window 86 therein to permit scanning of only one segment per dial; notches 88 can be provided for visual indication of the number encoded. As shown adjacent dials may have black and white peripheries 90 and 92 respectively to provide a mini-code 94, again to ensure unambiguous scanning of these dials. Such geared dials could be multiplied as many times as necessary to give any maximum value needed while retaining resolution down to the units level. The dials can be further subdivided for even better resolution.

Figure 12:
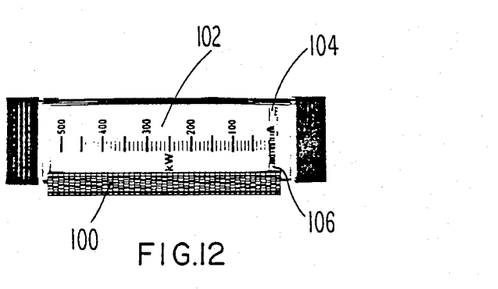
FIG. 12 shows how a linear meter can be converted to bar code readability.

FIG. 12 shows a way in which a linear reading instrument may be adapted for machine-readability using bar codes. Again, a segmented bar code label 100 is placed adjacent to the visually-readable indicia 102, each segment encoding a number corresponding to the value indicated by the indicia. In this case, a bar code 104 is attached to the instrument needle, and the scanner is programmed to only read the segment to which the needle is juxtaposed. A mini-code 106 may be provided for further insurance. In this way, the scanner will only read the segment opposite the needle. The same principle can be applied to a number of additional types of linear meters, including those in which individual LEDs light up opposite visually-readable indicia; the scanner can readily be programmed to only read the segment opposite the lit LED. Alternatively, the bar-coded segmented label could be printed on a translucent substrate and placed directly over the row of LEDs, so that a scanner could only read the segment over the lit LED.

Figure 13:
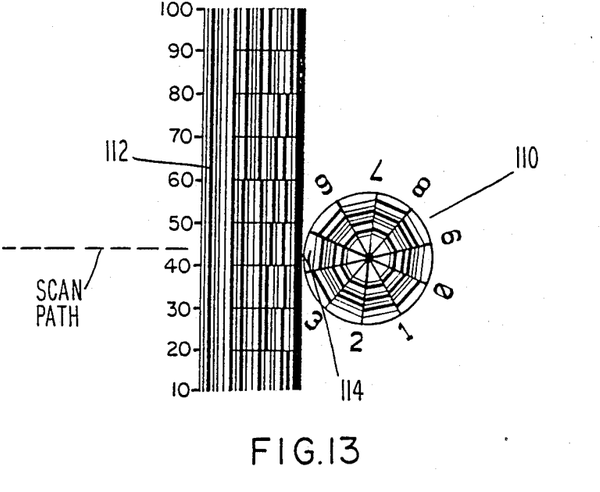
FIG. 13 shows a combination of linear and rotary scales for improved solution.

FIG. 13 shows a way in which increased resolution can be provided to a linear scale. It will be appreciated by those skilled in the art that it is difficult to program a scanner to accurately read bar code segments at or less than 1/32 of an inch high. However, by gearing a rotary dial 110 to a moving linear scale 112, so that the rotary dial 110 rotates in accordance with the quantity being measured, increased resolution can be provided. In this case, the scanner should be programmed to only read the segment in the circular dial 110 directly opposed to the linear scale 112. This can be assured by provision of a suitable window, or by providing a mini-code at 114. It will be observed that only one wedge of the circular scale 110 lines up with a segment of the linear scale 112; hence the mini-code will only be detected by the scanner with respect to that wedge. By choice of the proper ratios of the gears (not shown) rotating the dial 110 with respect to movement of the linear scale 112, e.g. one revolution upon movement between the indicia 40 and 50 on the linear scale, each such increment can effectively be divided into ten, thus providing substantially increased resolution.

Figure 14:
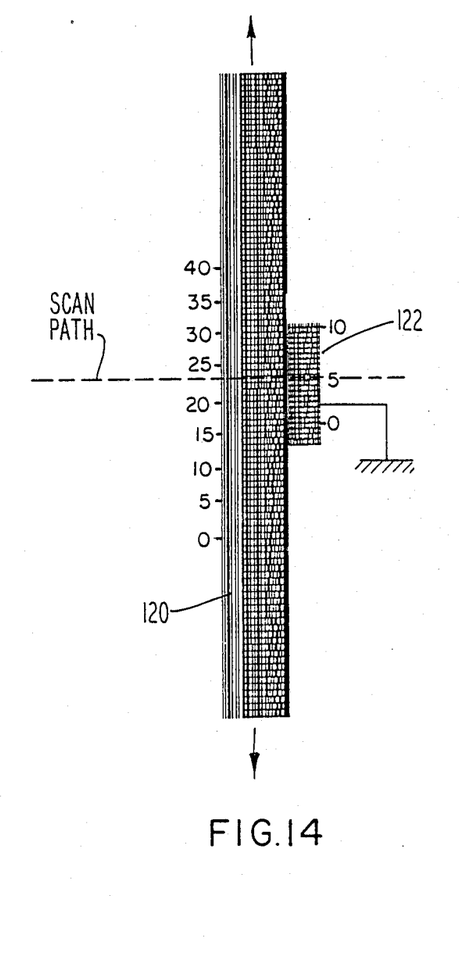
FIG. 14 shows how a vernier arrangement can be provided to obtain increased resolution in a bar coded analog system.

FIG. 14 shows a way in which further improvements can be realized. This uses the vernier principle, in which a first segmented scale indicating a more significant digit of a given value moves with respect to a second segmented scale in which the divisions are nine-tenths as wide. One then identifies the segment of the fixed scale which most closely aligns with one of the segments of the moving scale, and adds its number as the less significant digit of the overall reading. This principle is used in wide variety of applications including such things as vernier calipers, surveyors' instruments, micrometers, and other precision measuring devices. The example shown in FIG. 14 shows a linear scale 120 which moves up and down with a quantity to be measured and a fixed vernier scale 122. Both scales comprise bar-coded segment; but the ratio of the width of the bar-coded segments of the fixed scale 122 to those of the moving scale 120 is nine to ten, such that with movement of the movable scale 120, only one of the ten segments of the fixed scale 122 will line up directly across from one of the nine juxtaposed segments of the moving scale 120. In the case shown, segment 23 of the moving scale lines up best with segment 5 of the fixed scale, hence giving a total reading of 23.5. A bar code scanner can be programmed to only read the encoded values from the two segments which line up, i.e. one from the moving scale 120 and one from the fixed scale 122, thus directly providing correct reading of both the fixed moving scale segments. This would clearly provide improved accuracy as compared to that provided by subdividing the segments of the fixed scale by a factor of ten, while not increasing the discrimination required. Those skilled in the art will recognize that the same principle is employed in visual reading of a conventional vernier scale; one's eyes are required to discriminate between divisions ten times larger than if the vernier principle were not used. Further improvements to this embodiment of the invention might include quiet zones, mini-codes separating the fixed and moving scales, or separation of the segments of each scale from one another, any of which would further simplify automated identification of the segments which are correctly aligned.

It will be appreciated that there have been described a number of ways in which machine-readability can be provided for instruments in which analog quantities are indicated by a pointer or other indicator device juxtaposed to a scale comprising visually-readable indicia. The basic concept is that of associating bar coded segments with the corresponding positions on the scale and providing means for reliably ensuring that a scanner can only read the correct one of the segments. This may be provided by programming the scanner to look for predetermined code arrangements, such as presence of a mini-code indicative of the alignment of the pointer and the scale, and providing portions of the mini-code on each, such that they must be in juxtaposition before a good read can be detected, or by providing windows so that but a single segment can be "seen" by the scanner at any one time, or other expedients. Accordingly, while a number of embodiments of the invention relating to various types of instrumentation and their conversion to machine-readability have been shown, the invention should not be limited thereby, but only by the following claims.

I claim:

1. A method for converting an analog instrument that is adapted for visual-readability, to machine-readability, wherein the analog instrument is of the class having one or more means for indicating an analog quantity, each of the indicating means moving with respect to respective visually-readable scale indicia responsive to a total analog quantity being measured, the total analog quantity being represented by all of the one or more indicating means when read together, said method comprising the steps of:

providing a plurality of bar-coded scales, one said scale for each of the one or more indicating means, each said scale comprising a plurality of bar-coded segments, each bar-coded segment encoding a number corresponding to a value for the analog quantity indicated by the corresponding indicating means when juxtaposed to the corresponding indicia;

providing an encoded means for pointing to all of the one or more indicating means simultaneously in such a manner so as to point out a single one of said segments from each said scale;

providing a programmable and freely movable bar code scanner; and programming said scanner to scan only predetermined combinations of said segments and encoded pointing means, such that said scanner is enabled to scan only said single one of said segments from each said scale.

2. Apparatus for converting an analog instrument which includes visually-readable quantity indicator means to machine-readability, said apparatus comprising a bar-coded scale having a plurality of bar-coded segments, each said segment encoding a unique number that is indicative of an amount of an analog quantity measured by said instrument, and means, responsive to said quantity indicator means, for ensuring that an unguided bar code scanner reads a single segment of said bar-coded scale upon scanning instrument, such that said segment read by said scanner correctly corresponds to said amount indicated for the analog quantity at its respective position by said quantity indicator means.

3. The apparatus of claim 2 wherein said means for ensuring that a scanner reads a single segment of said bar-coded scale comprises additional bar coded indicia, said indicia being a part of a complete bar code, each of said segments comprising the remaining part of said complete bar code, whereby a bar code scanner is enabled to scan one of said segments only when said single segment is in juxtaposition to said additional bar code indicia.

4. A system for converting an analog instrument having visually-readable quantity indicia to machine-readability, wherein the analog instrument also includes indicator means for pointing to one of the visually-readable quantity indicia responsive to an amount of the quantity, said system comprising a bar code scale having a plurality of bar code segments, each said bar code segment encoding a unique number corresponding to the quantity of a single indicium, and means for ensuring that an unguided bar code scanner scans only said bar code segment corresponding to the indicium pointed to by said indicator means.

5. The system of claim 4, wherein said means for ensuring that an unguided bar code scanner scans only said segment corresponding to the indicium pointed to by said indicator means comprises bar code means on said indicator means, and said system comprises a scanner adapted to read bar code only from a predetermined combination of said segments and said bar code means on said indicator means.

6. A device for converting an analog quantity to numeric data, the analog quantity representable by a position of a pointer with respect to a reference position, the pointer having encoded information thereon, said device comprising:

a bar code scale made up of bar code segments, a value encoded by each said bar code segment corresponding to the value of said analog quantity as represented by the position of the pointer with respect to the reference position;

means for freely scanning said scale and the pointer at the position of the pointer; and means for conversion of said bar code segment and encoded information on the pointer thus scanned to the corresponding value.

7. The device of claim 6 further comprising bar code label means identifying said analog quantity.

8. The device of claim 6 wherein said quantity is a volume.

9. The device of claim 6 wherein said quantity is a temperature.

10. The device of claim 6 wherein said quantity is a length.

11. A method of entry of a number representing an analog quantity into a data processing system, comprising the steps of:

providing a bar code scale having a plurality of segments each of which encodes a respective number, said numbers being chosen and said segments being spaced such that each said segment encodes a unique value for the analog quantity when said scale is juxtaposed to means for displaying the analog quantity, said displaying means also including encoded information thereon;

scanning said segment that is juxtaposed to said displaying means, and said encoded information on said displaying means; and correlating said unique value encoded by said scanned segment and said displaying means with the corresponding number.

12. The method of claim 11 comprising the additional steps of providing a bar code label identifying said quantity, scanning said label, and correlating said quantity with said number.

13. The method of claim 11 wherein said quantity is a volume.

14. The method of claim 11 wherein said quantity is a temperature.

15. The method of claim 11 wherein said quantity is a length.

* * * * *

UNITED STATES PATENT AND TRADEMARK OFFICE
CERTIFICATE OF CORRECTION

PATENT NO. : 4,864,302

DATED : September 5, 1989

INVENTOR(S) : Bowers

It is certified that error appears in the above-identified patent and that said Letters Patent is hereby corrected as shown below:

Column 13, line 16, please add the words --modification of the physical structure of the meter to allow-- after the words "context that" and before "machine-readability".

Signed and Sealed this

Twenty-eighth Day of August, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,864,302

DATED : September 5, 1989

INVENTOR(S) : David L. Bowers

It is certified that error appears in the above-identified patent and that said Letters Patent is hereby corrected as shown below:

ON TITLE PAGE:

Please correct the name of the inventor to read:

DAVID L. BOWERS

Signed and Sealed this

Twenty-ninth Day of September, 1992

Attest:

DOUGLAS B. COMER

*Attesting Officer*    *Acting Commissioner of Patents and Trademarks*